United States Patent [19]
Sugao

[11] Patent Number: 6,135,160
[45] Date of Patent: Oct. 24, 2000

[54] MULTI-WOUND STAINLESS STEEL PIPE

[75] Inventor: Keizo Sugao, Shizuoka Prefecture, Japan

[73] Assignee: Usui Kokusai Sangyo Kaisha Ltd., Japan

[21] Appl. No.: 09/337,852

[22] Filed: Jun. 21, 1999

[30] Foreign Application Priority Data

Jun. 22, 1998 [JP] Japan .................................. 10-191056

[51] Int. Cl.$^7$ ................................................... F16L 9/147
[52] U.S. Cl. .......................... 138/142; 138/143; 138/171
[58] Field of Search ................... 138/142, 143, 138/171

[56] References Cited

U.S. PATENT DOCUMENTS

| | | | |
|---|---|---|---|
| 3,610,290 | 10/1971 | Anderson et al. ...................... | 138/143 |
| 3,775,194 | 11/1973 | Dromsky .................................. | 138/141 |
| 4,784,311 | 11/1988 | Sugao ...................................... | 138/142 |
| 4,867,269 | 9/1989 | Lalikos et al. .......................... | 138/131 |
| 5,265,793 | 11/1993 | Usui et al ................................ | 138/143 |
| 5,297,410 | 3/1994 | Goff ........................................ | 138/143 |
| 5,447,179 | 9/1995 | Gibbs et al. ............................ | 138/143 |
| 5,458,156 | 10/1995 | Okubo et al. ........................... | 138/143 |
| 5,553,640 | 9/1996 | Ferenczy et al. ....................... | 138/143 |
| 5,958,602 | 9/1999 | Usui ........................................ | 138/143 |

*Primary Examiner*—James Hook
*Attorney, Agent, or Firm*—Anthony J. Casella; Gerald E. Hespos; Michael J. Porco

[57] ABSTRACT

A multi-wound stainless steel pipe produced by plastic-deforming a hoop material made of a stainless steel sheet applied with a Cu-brazing material on the surface thereof to a multi-wound pipe and after melting the brazing material between the walls of the multi-wound pipe, cooling the molten brazing material, wherein the Cu-brazing material between the walls and the Cu-brazing material at the surfaces of the inside surface and the outside surface of the pipe are diffused into the base material at a depth of from 0.5 $\mu$m to 15 $\mu$m and bonded thereto. The multi-wound stainless steel pipe is excellent in the pressure resisting strength and working strength and has a high quality.

4 Claims, 2 Drawing Sheets

MULTI-WOUND STAINLESS STEEL PIPE

BACKGROUND OF THE INVENTION

1. Field of the Invention

The present invention relates to a multi-wound stainless steel pipe produced by winding a hoop material made of a stainless steel sheet using brazing.

2. Description of the Prior Arts

In general, a multi-wound metal pipe is produced as a product by plastic-deforming a hoop material the surface of which is applied with a Cu brazing material into a multi-wound pipe by a forming apparatus and after melting the Cu brazing material between the walls of the multi-wound pipe by a heating apparatus, solidifying the molten brazing material by a cooling apparatus. In the case of a multi-wound stainless steel pipe, the pipe is generally produced using a stainless steel sheet the surface of which is directly applied with Cu brazing as the hoop material and a multi-wound stainless steel pipe produced using a stainless steel sheet having Ni-brazed layer between the surface of the stainless steel sheet and a Cu-brazed layer is also known.

However, in a conventional multi-wound stainless steel pipe, there are following problems.

That is, when Cu brazing is directly applied onto the surface of a stainless steel sheet, there is a fault that the adhesive force of the stainless steel and Cu is weak and thus the sufficient pressure resisting strength and working strength in the state of being produced as a multi-wound pipe cannot be obtained. Also, when an Ni-brazed layer is formed between the surface of a stainless steel sheet and a Cu-brazed layer, an adhesive force in the sheet state is obtained but there is a problem that in the brazing temperature range after forming multi-wound pipe, the Ni component of the base material of the stainless steel and component of Ni brazing are alloyed with Cu to greatly increase the Ni concentration, which results in lowering the ductility of the brazing material to cause cracking and a releasing phenomenon of the brazing material at terminal working.

SUMMARY OF THE INVENTION

The present invention has been made for solving the above-described problems of conventional multi-wound stainless steel pipes and an object of this invention is to provide a high-quality multi-wound stainless steel pipe having an excellent pressure resisting strength and an excellent working strength.

That is, according to the present invention, there is provided a multi-wound stainless steel pipe produced by plastic-deforming a hoop material made of a stainless steel sheet the surface of which is applied with a Cu-brazing material to a multi-wound pipe, and after melting the Cu-brazing material existing between the walls of the multi-wound pipe, cooling the molten Cu-brazing material, wherein each of the Cu-brazing material between the walls of the multi-wound pipe and the Cu-brazing materials at the inside surface and the outside surface of the pipe is diffused into the base material thereof at a thickness of from 0.5 $\mu$m to 15 $\mu$m and bonded thereto. Also, in other embodiment of this invention, the Cu concentration in the Cu-brazing material after brazing is at least 75% or the thickness of the Cu-brazing material remaining between the walls of the pipes after brazing is defined to be at least 0.5 $\mu$m.

Stainless steel used as the stainless steel sheet in this invention includes, for example, austenite-base stainless steels such as SUS 304, SUS 304L, SUS 316, SUS 316L, SUS 321, etc., and ferrite-base stainless steels such as SUS 410L, SUS 430, SUS 430LX, SUS 436L, etc. Also, the reason of diffusing the Cu-brazing material between the walls of the multi-wound pipe and the Cu-brazing material at the surfaces of the inside wall and the outside wall of the pipe into the stainless steel sheet (base material) is to increase the bonding force of the Cu-brazing material and the stainless steel sheet, and the reason that the thickness of the diffused layer thereof is limited to the range of from 0.5 $\mu$m to 15 $\mu$m is that if the thickness thereof is thinner than 0.5 $\mu$m, the strength of the boundary between the SUS base material and the Cu-brazing material is weak, while if the thickness exceeds 15 $\mu$m, the SUS base material is deteriorated.

Also, in this invention, the Cu concentration in the Cu-brazing material after brazing is defined to be at least 75% by the following reasons.

That is, the components of the Cu-brazing material remaining between the walls of the multi-wound pipe and the inside surface and the outside surface of the pipe form solid solutions with the main constituents (Cr, Ni, and Fe) of SUS diffused from the base material side and it has been found that when the Cu concentration of the cu-brazing material after brazing is less than 75%, the contents of Cr, Ni, etc., in the brazing material are increased to lower the strength such as the ductility, etc., of the brazing material. Accordingly, for preventing lowering of the strength such as the ductility of the Cu-brazing material, it is necessary to ensure at least 75%, preferably from about 75% to about 90% of the Cu concentration.

Furthermore, in the present invention, the thickness of the Cu-brazing material remaining between the walls of the multi-wound pipe after brazing is limited to be at least 0.5 $\mu$m because if the thickness is thinner than 0.5 $\mu$m, the bonding state of the Cu-brazing material becomes near the bonded state of the base materials of the stainless steel sheets each other by a thermal diffusion and a sufficient bonding strength of the brazing material is not obtained.

In addition, as a method of producing the multi-wound stainless steel pipe of this invention, a method of plastic-deforming a hoop material to a multi-wound pipe by a forming apparatus, while the braising material existing between the walls of the multi-wound pipe is in a molten state by a heating apparatus, by uniformly pressing the pipe in the diameter direction of the pipe from the inside or the outside or by pulling the pipe to the axial direction to press-welding the multi-wound walls each other, and solidifying the molten brazing material by a cooling apparatus to provide a product can be employed.

The above-described forming apparatus is generally constituted by a guide roll of a hoop material, forming rolls for forming multi-wound pipe, and finishing regulating rolls successively disposed, and further a plug-attached rod is disposed from the guide roll side of the hoop material.

In this case, a pressing force is uniformly applied to the above-described multi-wound pipe in the diameter direction thereof from the inside or the outside, or the above-described pipe is pulled to the axial direction to impart the tensile force in the axial direction, because the space without having the brazing layer between the walls is removed as completely as possible and also even when the hoop material has a dispersion of dimensions, the adhesion at the outer seamed portion is improved. As the means, there are a method by a plug or a mechanical tube-expanding head mounted in the inside of the pipe, a method of using a press roll, and a method of changing the transporting speed of the pipe to impart a tensile force in the axial direction to said pipe, whereby the multi-walls are press-welded each other in the diameter direction.

In the multi-wound stainless steel pipe of this invention, by diffusing the Cu-brazing material between the walls of the pipes and the Cu-brazing material at the inside surface and at the outside surface of pipe into the SUS base material, the strength between the multi-wound walls having increased bonding force of the Cu-brazing material and the SUS base material is obtained, the strength of the boundary of the SUS base material and the Cu-brazing material is increased, and the pressure-resisting strength and the working strength become excellent.

DETAILED DESCRIPTION OF THE INVENTION

Figure 1:
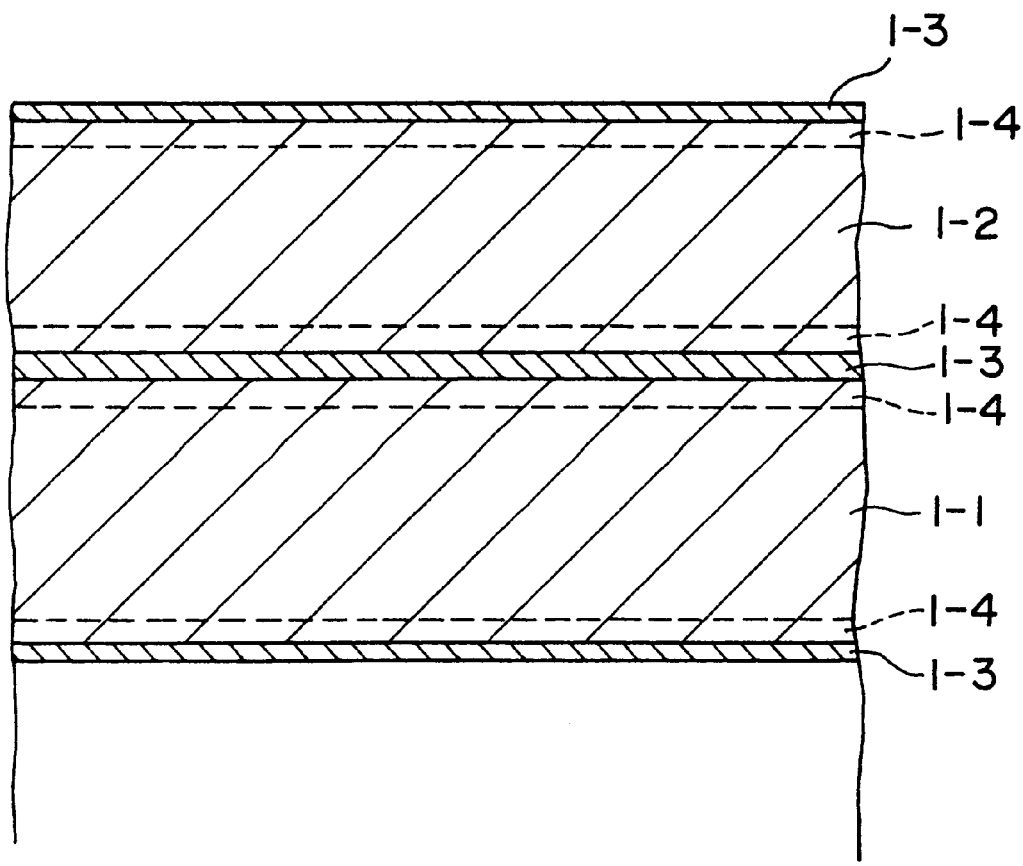
FIG. 1 is a partially enlarged schematic side view showing the cross-sectional structure of the multi-wound stainless steel pipe of this invention and FIG. 2 is a schematic view showing an embodiment of the whole constitution of a production apparatus of the multi-wound stainless steel pipe.
Figure 2:
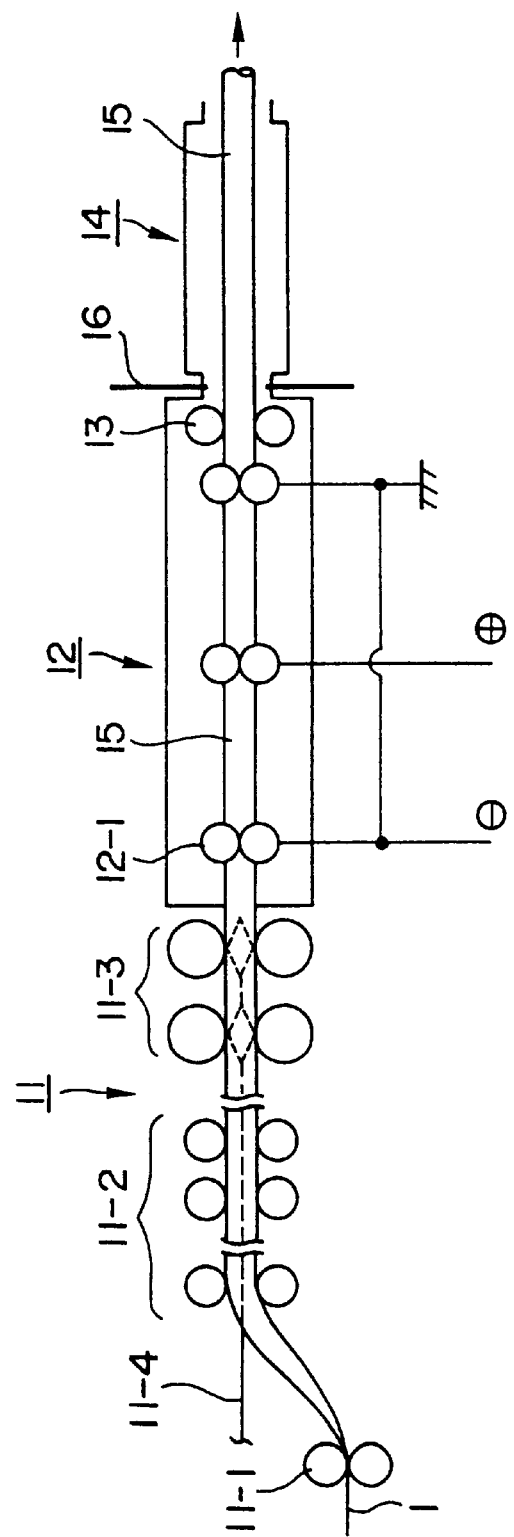

The present invention is explained based on FIG. 1 and FIG. 2 and in this case, a double-wound stainless steel pipe is explained as an embodiment of this invention.

First, a multi-wound stainless steel pipe producing apparatus used for producing the above-described double-wound stainless steel pipe is explained.

In a double-wound forming apparatus 11 shown in FIG. 2, a guide roll 11-1 for guiding a hoop material 1, which is formed to a double-wound pipe, to a forming step, many pairs of pipe-making or forming rolls 11-2 of forming the hoop material 1 to a double-wound pipe from a sheet form, and finishing and regulating rolls 11-3 successively disposed and a plug-attached rod 11-4 is disposed from the side of the above-described guide roll 11-1.

As a heating apparatus 12, for example, a resistant heating system by plural electric current passing rolls (rotary electrodes) disposed in the line direction with a proper interval is employed. The inside of the heating apparatus is a non-oxidative atmosphere or a reducing gas atmosphere.

Also, press rolls 13 as a means of press-welding the double-wound walls each other in the diameter direction has a structure of uniformly pressing the outer surface of the double-wound pipe 15 formed by the above-described forming apparatus 11 in the diameter direction from outside and the disposing position thereof is an inlet side of a cooling apparatus 14 from the heating apparatus 12.

The cooling apparatus 14 is disposed just behind the heating apparatus and has a structure that many cooling medium spraying nozzles (not shown) are disposed such that the outer surface of the double-wound pipe 15 can be uniformly and quickly cooled. Specifically, for example, the cooling apparatus of a structure of a cooling jacket type having formed many nozzle holes at the inside wall such that a cooling medium is sprayed from the nozzle holes onto the double-wound pipe passing through the inside thereof is used. As the cooling medium, a gas is mainly used but a liquid such as water, etc., can be used.

Also, as a primary cooling means for cooling the double-wound pipe 15 as quick as possible, nozzles 16 are disposed just behind the heating apparatus and by spraying a cooling medium from the nozzles, the brazing material can be quickly cooled to about the solidifying point thereof.

As described above, as the cooling apparatus, it is preferred to constitute the apparatus by the primary cooling means composed of nozzles 16 and the secondary cooling means composed of the cooling apparatus 14 disposed at the down stream side of said nozzles but both quick cooling to about the solidifying point of the brazing material and cooling of the double-wound pipe can be carried out in the cooling apparatus 14.

In the multi-wound pipe producing apparatus of the above-described construction, the hoop material 1 made of a stainless steel sheet 1-1 both surfaces of which are applied with Cu plating is unwound from an uncoiler (not shown), is formed to a pipe 15 having double walls by the double-wound forming apparatus 11, and is introduced into the heating apparatus 12. In the heating apparatus 12, from a d.c. power source, an electric current is applied to the pipe through plural electric current passing rolls 12-1 to heat the pipe until the state that by the resistant heat of the pipe, Cu as the brazing material between the walls is melted and the diffusion of the molten brazing material into the walls proceeds is attained. In this case, the temperature is usually from 1083° C. to 1200° C.

The double-wound pipe 15 from the heating apparatus 12 is cooled by the cooling apparatus 14 disposed just behind the press rolls, whereby the diffusion bonding of the brazing material between the walls is finished.

In addition, as the heating means of the multi-wound pipe, a high-frequency heating coil may be employed in place of the above-described resistant heating system and also, a general heating furnace may be used as a brazing furnace.

Also, although it is not shown in the figure, when a press rolls are formed just behind the heating apparatus, because one end side (seamed portion side) of the outermost wall of the double-wound pipe is forcibly pressed by the press rolls from outside, the wall is adapted and adhered to the wall of the inner side and releasing of the outer seamed portion is prevented.

In the double-wound stainless steel pipe of this invention produced by the above-described apparatus, as a part of the cross-sectional structure shown in FIG. 1, between an inside wall 1-1 and an outside wall 1-2, and at the inside/outside surfaces of said steel pipe are formed Cu-brazing material layers 1-3, and at the inside surface and the outside surface of the inside wall 1-1 and at the inside surface and the outside surface of the outside wall 1-2 are formed diffused layers 1-4 having a thickness of from 0.5 $\mu$m to 15 $\mu$m. Also, in the double-wound stainless steel pipe, the concentration of Cu of the Cu-brazing material layers 1-3 remaining between the inside wall 1-1 and the outside wall 1-2, and at inside/outside surfaces of said steel pipe is at least 75% and the thickness of the Cu-brazing material layers 1-3 remaining between the inside wall 1-1 and the outside wall 1-2 is at least 0.5 $\mu$m.

As described above, in the double-wound stainless steel pipe of this invention, by diffusing the Cu-brazing material between the walls of the pipe and the Cu-brazing material at the inside surface and the outside surface of the pipe into the base material, the bonding force of the Cu-brazing material and the base material (stainless steel sheet) is increased and the deterioration of the SUS base material can be prevented. Also, by ensuring at least 75% of the Cu concentration of the Cu-brazing material after brazing, the strength such as the ductility, etc., of the Cu-brazing material can be maintained. As a matter of course, these effects are also similarly obtained in multi-wound stainless steel pipes other than the double-wound stainless steel pipe.

As hereunder, the invention is explained based on the following examples.

EXAMPLE 1

Each of stainless steel sheets prepared by applying Ni-plating having a thickness of from 0.05 μm to 0.1 μm to both surfaces of each sheet material of SUS 304L having a thickness of 0.35 mm and applying thereon Cu-plating having a thickness of about 5 μm was used as a hoop material, after forming each double-wound pipe having a diameter of 4.76 mm and a thickness of 0.7 mm by the multi-wound stainless steel pipe producing apparatus shown in FIG. 2, a heat treatment of from 1100 to 1200° C. was applied for from 2 to 15 seconds by directly passing an electric current through the pipe, and thereafter, each pipe was cooled for from 0.7 to 1 minute by a cooling apparatus to provide each of double-wound stainless steel pipes each having a different depth of the diffused layer.

The result of determining the strength of the boundary between the SUS base material and the brazing material of each double-wound stainless steel pipe obtained is shown in Table 1 below. The strength of the boundary portion of the SUS base material and the brazing material was obtained by a spreading out test by a 60 degree cone.

It is apparent from Table 1 that when the depth of the diffused layer is less than 0.5 μm, the strength of the boundary of the SUS base material and the brazing material is weak and breaking occurs from that portion to the diffused layer, and when the depth of the diffused layer exceeds 15 μm, the deterioration of the SUS base material occurs, whereby the depth of the diffused layer is preferably in the range of from 0.5 μm to 15 μm.

TABLE 1

| Depth of diffused layer (μm) | Result |
| --- | --- |
| Less than 0.5 | Broken from the boundary of SUS base material and brazing material. |
| 0.5 to less than 5 | Good |
| 5 to less than 10 | Good |
| 10 to less than 15 | Good |
| 15 to less than 20 | Deterioration of SUS base material occurred. |

EXAMPLE 2

By the same method as in Example 1, double-wound stainless steel pipes each having a different Cu concentration in the brazing material after brazing in the range of from about 70% to about 90% were produced. The thickness of the remaining brazing material in the example was from 4 to 5 μm and the depth of the brazing material in the SUS base material was from 5 to 6 μm. The result of examining the crack occurrence at the brazing material of the intermediate wall portion of each double-wound stainless steel pipe is shown in Table 2 below. The crack occurrence was obtained by the spreading out test by a 60 degree cone.

According to the results shown in Table 2, when the Cu concentration of the brazing material after brazing was about 70%, cracks occurred in the brazing material layer at the intermediate wall portion, while when the Cu concentration was in the range of this invention of from about 75% to about 90%, no occurrence of cracks in the brazing material layer at the intermediate wall portion was observed and a stable brazing strength was obtained.

TABLE 2

| Cu Concentration (%) | Crack occurrence |
| --- | --- |
| approx. 90 | No cracks observed. |
| approx. 85 | No cracks observed. |
| approx. 80 | No cracks observed. |
| approx. 75 | No cracks observed. |
| approx. 70 | Cracks occurred in the brazing material layer at the intermediate wall portion. |

EXAMPLE 3

By the same method as in Example 1, double-wound stainless steel pipes each having a different thickness of the remaining brazing material at the intermediate wall portion after brazing were produced. The result of examining the crack occurrence at the remaining brazing material at the intermediate wall portion of each double-wound stainless steel pipe is shown in Table 3 below. The data of the crack occurrence was again obtained by the spreading out test by a 60 degree cone.

According to the results shown in Table 3, when the thickness of the remaining brazing material at the intermediate wall portion after brazing was less than 0.5 μm, cracks occurred in the brazing material layer, while when the thickness of the remaining brazing material was 0.5 μm or more, no occurrence of cracks was observed and a stable brazing strength was obtained.

TABLE 3

| Thickness of remaining brazing material at intermediate wall portion (μm) | Crack occurrence |
| --- | --- |
| Less than 0.5 | Cracks occurred in the brazing material layer at intermediate wall portion. |
| 0.5 to less than 1.0 | No cracks observed. |
| 1.0 to less than 5.0 | No cracks observed. |
| 5.0 to less than 10.0 | No cracks observed. |

As explained above, in the multi-wound stainless steel pipe of this invention, by diffusing the Cu-brazing material between the walls of the pipe and the Cu-brazing material at the inside surface and the outside surface of the pipe into the base material, the bonding force of the Cu-brazing material and the base material (stainless steel sheet) is increased, whereby the strength between the multi-wound wall layers is obtained, the strength of the boundary of the SUS base material and the Cu-brazing material is high, the strength such as the ductility of the Cu-brazing material after brazing can be maintained, and accordingly the pressure resisting strength and the working strength are excellent.

What is claimed is:

1. A multi-wound stainless steel pipe produced by plastic-deforming a hoop material made of a stainless steel sheet, the stainless steel sheet having opposed surfaces, each said surface having a Cu-brazing material applied thereto prior to the plastic-deforming to produce the multi-wound pipe, the multi-wound pipe further being subjected to heating sufficient for melting the Cu-brazing material existing between walls of the multi-wound pipe and subsequently cooling the molten Cu-brazing material, wherein the Cu-brazing material between the walls of the multi-wound pipe and the Cu-brazing materials on inside and outside surfaces of the pipe are diffused into the stainless steel to a thickness of from 0.5 μm to 15 μm and bonded thereto, and wherein a portion of the Cu-brazing material exists between adjacent walls of the multi-wound stainless steel pipe to a thickness of at least 0.5 µm and wherein a Cu concentration in the brazing material after brazing is at least 75%.

2. A multi-wound stainless steel pipe according to claim 1 wherein the Cu concentration in the brazing material is from 75% to 90%.

3. A multi-wound stainless steel pipe according to claim 1 wherein the stainless steel sheet is formed from stainless steel selected from the group consisting of SUS 304, SUS 304LI, SUS 316, SUS 316L, SUS 321, SUS 410L, SUS 430, SUS 430LX, and SUS 436L.

4. A multi-wound stainless steel pipe having a plurality of layers of stainless steel and a Cu-brazing material between adjacent layers of stainless steel and on both inner and outer surfaces of the pipe, the multi-wound stainless steel pipe being heated sufficiently for the Cu-brazing material to be diffused into the stainless steel to a thickness of from 0.5 µm to 15 µm, the Cu-brazing material defining a thickness between adjacent layers of the multi-wound stainless steel pipe of at least 0.5 µm, and wherein the Cu concentration in the Cu-brazing material, after brazing, is at least 75%.

* * * * *